United States Patent Office 2,753,130
Patented July 3, 1956

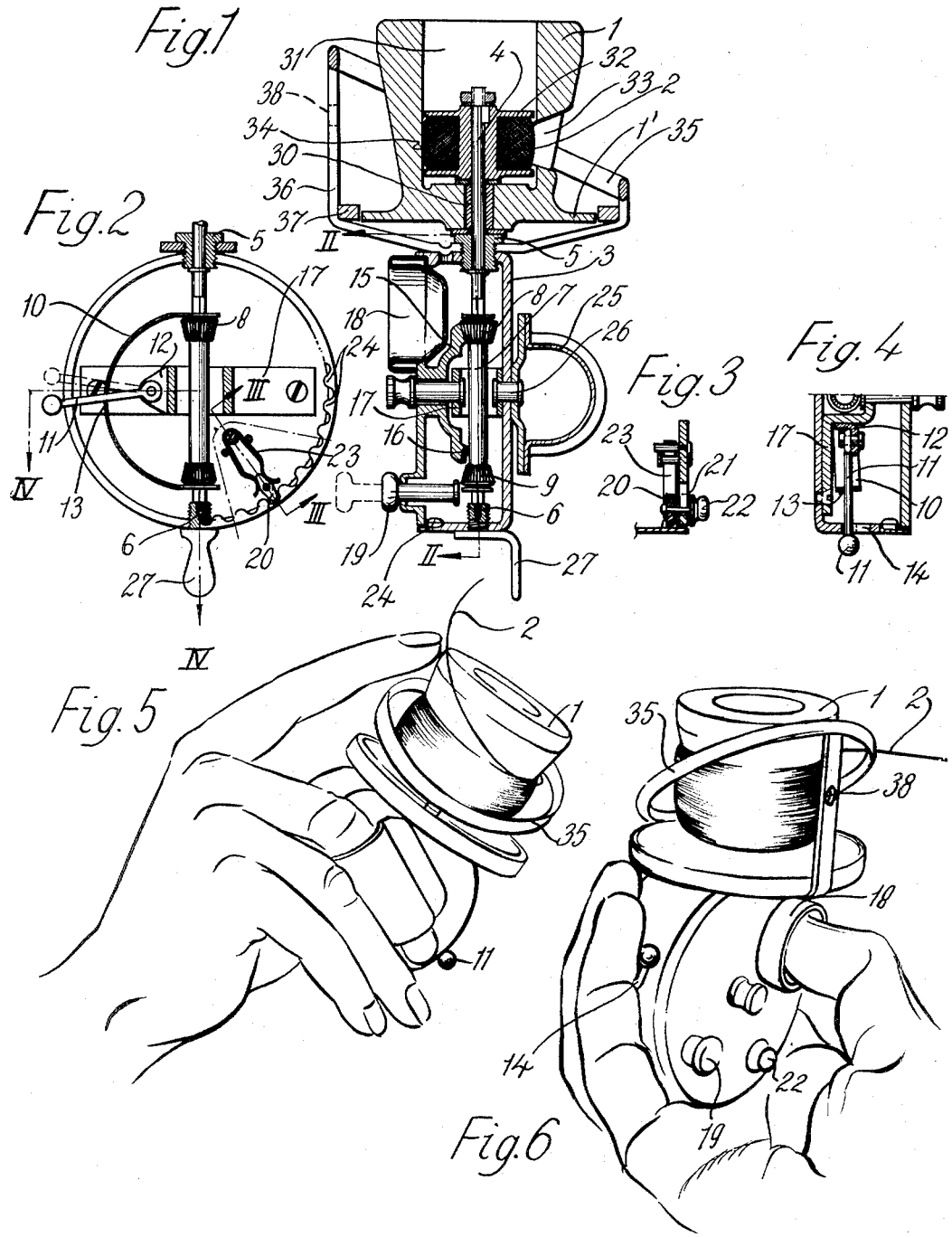

2,753,130

LINE FISHING IMPLEMENT

Gösta Tage Filip Sjögren, Stockholm, Sweden

Application September 1, 1953, Serial No. 377,901

8 Claims. (Cl. 242—96)

This invention relates to a line fishing implement useful for trolling and the main object of the invention is to provide an implement of such type, which may be easily handled with one hand only, if desired, so that the angler may have his other hand free to swing a landing net or gaff or to otherwise assist in landing a caught fish.

Another object of the invention is to provide a fishing implement of the type defined, which is easy to store and carry and which permits making long casts with the lure without appreciable effort when such long casts are desired and which is also well adapted for dragging a lure behind a rowboat.

The invention also has for its object to provide a fishing implement in which the fishing line, preferably a thin, solid string of synthetic resin, shows no tendency to get entangled and with which the baits or lures of very different weights may be used without changes or adjustments.

A still further object of the invention is to provide such an implement, which may be alternatively used with both hands and which may be used alone or combined with a fishing rod of suitable type.

The fishing implement according to the invention is of the type having a rotatable winding drum for the fishing line, which drum is mounted at one end only on a holder to permit the fishing line to leave the drum in a substantially axial direction without rotation of the drum, when the lure is thrown or line paid out, and which may also be manually rotated to pull in the line tangentially relatively to the drum and wind it up thereon for a new cast, and the main feature of the invention is that the holder carrying the winding drum is designed as a handle-like body having means facilitating its gripping and holding with one single hand and that the winding drum is connected to a driving mechanism including a gearing in the holder and means for imparting a rotary driving motion to the drum by the aid of the same hand as grips the holder.

Further objects and features of the invention will be apparent from the following detailed description of a preferred embodiment of the invention shown in the accompanying drawing; the invention being however not limited to this illustrated form since both shape, size and combination of parts may be modified without departing from the inventive idea and without losing the advantageous results gained by bringing this idea into practice in any convenient manner within the scope of the appended claims.

In the drawing:

Fig. 1 is a sectional elevation of the implement,

Fig. 2 is in part a section of the holder of the implement taken along the line 2—2 in Fig. 1 and in part a front view of the holder with the rotatable lid broken away (lower right portion), to show the rattling brake, Fig. 3 is a partial section through the rotatable lid of the holder taken along the line 3—3 in Fig. 2 and showing the rattling brake in sideview, Fig. 4 is a section taken along the line 4—4 in Fig. 2, Fig. 5 shows the position of the implement when casts are made and Fig. 6 shows the position of the implement when the line is pulled in with one hand only.

Referring to the structural features of the fishing implement as illustrated in the drawing it comprises generally a winding drum 1 for the fishing line 2 and a holder casing 3 on which the drum 1 is mounted. The holder casing 3 is substantially circular in front view and the winding drum 1 is mounted with its axis of rotation substantially perpendicular to the centre axis of the casing and more particularly the drum 1 is mounted on a shaft 4 extending diametrically through the casing 3 near the bottom or back thereof and projecting through a suitable bearing bushing 5 in the side wall of the casing. The inner or lower end of the shaft 4 is pivoted in a suitable socket bearing 6.

The portion of the shaft 4 extending inside the bushing 5 has a square or unround cross section and carries an axially displaceable sleeve 7 provided at both its ends with bevel gear portions 8 and 9 respectively. The sleeve 7 may be shifted up and down along the shaft 4 by means of a yoke 10 which is actuated by a shifting lever 11 which is swingably mounted on a bracket 12 within the holder casing 3. The lever 11 extends through a hole 13 in the yoke 10 and projects through a slot 14 in the side wall of the casing 3. The slot 14 in the casing is formed like a U, and the lever 11 is made of a resilient material such as steel and tensioned towards the ends of the shanks of the slot, so that the lever will remain in set position until it is intentionally displaced, thus keeping the sleeve 7 in one of two positions.

The holder casing 3 has a front lid 15 shaped like a bevelled gear wheel with bevelled teeth 16 on its inside. These teeth mesh with the teeth of one of the gear portions 8 or 9 of the sleeve 7 dependent on the position of the sleeve 7 and the actuating lever 11, and thus the shaft 4 will be rotated in one direction or the other if the lid is turned. The lid is pivotally mounted on a bracket 17 secured to the bottom or back of the casing 3 and bridging the sleeve 7 in spaced relationship. The gear wheel lid 15 is suitably removably mounted to allow admission to the interior of the casing 3.

In the lid 15 there is provided a hole receiving a fixed thumb socket 18 having an edge protruding over the front surface of the lid for giving a convenient depth to the socket. This socket makes it possible to turn the lid 15 like a crank means by a swinging motion of the thumb on the hand gripping the implement. Diametrically opposed to the thum socket 18 there is provided a crank handle 19 mounted in a bushing or hole in the lid so that it may be pulled out when used but pushed back in for convenience when not in use. By the aid of this handle the implement may be used with two hands when so desired, then one hand holding the implement and the other hand turning the knob or handle 19 for pulling in the line.

At the edge of the lid 15 there is also provided a radially adjustable rattling pawl 20 pivoting about a pin passing through a radial slot 21 in the lid and provided with a setting button or knob 22 externally of the lid. The pawl 20 is actuated by a hair pin spring 23 having shanks extending radially relatively to the lid and embracing the pawl to permit the latter to resiliently swing in both lateral directions when being in its outermost position and to also resiliently keep the pawl in either of its innermost or its outermost position relatively to the lid. The pawl 20 is in its outermost position adapted to cooperate with internal teeth or cogs 24 provided inside the edge of the holder casing 3 so as to serve as a brake and rattling mechanism calling the angler's attention when line is unintentionally paid out, for instance when a fish bites.

On the back of the holder casing 3 there is externally mounted a finger sleeve 25 which is swingable about a rivet 26, which is concentrically located relatively to the casing, and which is adapted to receive one finger, preferably the middle finger, of the angler's hand, when the implement is used for cast fishing or when the line is pulled in. Due to the swingability of the finger sleeve 25 the position of the implement in the hand may be easily changed as between the positions shown in Figs. 5 and 6 without there being any risk for getting the implement out of control. At the lower side of the casing 3—diametrically opposite the winding drum 1—there is further provided a downwardly projecting short pin 27 to facilitate holding the implement in proper position with one hand only when pulling in the line, see Fig. 6, the pin then being gripped between the inner portions of the middle and the ring fingers.

The winding drum 1 is in the illustrated form of the implement freely rotatably mounted on the external portion of the shaft 4 suitably by means of bearing bushing 30, and the drum has a slightly conical form, as shown, tapering towards the holder casing 3 and near its inner end the drum is provided with a radial flange 1' preventing the line 2 received on the drum from sliding down towards the holder casing.

In the drum 1 there is provided a cylindrical cavity 31 opening towards the outer end of the drum. From the bottom of this cavity 31 projects the outer end of the shaft 4, which carries a fixed spool 32 for a reserve portion of the fishing line 2, which may be paid out in emergency cases, for instance if the lure is set fast in the bottom or if a large fish is to be tired out before landing. The innermost end of the line 2 is secured to the spool 32 and the line then passes out through a slot or opening 33 in the side wall of the drum. It will be obvious that the reserve portion of the line wound up on the inner spool 32 may only be utilized when the whole length of line wound up outside the drum 1 has been paid out and that the reserve portion of the line cannot be paid out without rotation of the shaft 4 either by a pull in the line or by intentional turning of the lid 15.

The cylindrical cavity 31 of the drum 1 has its axis, which is parallel to the shaft 4, slightly offset in relation to the axis of the shaft 4 in a direction towards the line opening 33, so that the reserve portion of the line 2, when filling the spool 32 completely, will be wedged between the spool and the inside of the drum at 34 and consequently serve to establish a positive coupling between the shaft 4 and the drum 1, so that the latter may be rotated by the driving mechanism for subsequent winding up of line outside the drum. This "clutch coupling" is, of course, wholly automatic and needs no attention but offers the advantage that the drum 1 need not be externally loaded with a greater length of line than is sufficient for most extensive casts desired which in turn reduces the risk for entanglement on the drum and also makes it possible to reverse the direction of rotation of the drum more easily. Frequent reversal of the direction of rotation of the drum 1 accomplished by shifting the lever 11, for instance after each ten casts, has been found very advantageous to counteract the tendency of the line 2 to twist due to the spinning of the commonly used lures.

To facilitate distribution of the windings of the fishing line 2 on the drum 1 when pulling in the line there is provided guiding means secured to the holder casing 3 and including an inclined annular rail 35 surrounding the drum 1 and having its upper point just below the top of the drum 1 and its lower point slightly above the flange 1' of the drum. This rail 35 is carried by a supporting yoke 36 having its web portion secured to the upper end of the holder casing 3 and the yoke further carries an annulus 37 placed substantially in the radial plane of the flange 1' of the drum to assist in preventing the fishing line 2 from sliding down from the drum 1.

The fishing line 2 passes over and touches the rail 35 when it is pulled in and thus a slight turning of the implement is sufficient to distribute the line over a suitable axial length of the drum.

In the longer shank of the supporting yoke 36 there may preferably be provided a hole 38 or like attachment for a strap or string (not shown) which may form a loop around the angler's neck and thus carry the implement in a substantially vertical position in front of the angler's breast so that the angler himself may row a boat while dragging the lure behind. In such a case a suitable length of line is preferably paid out by a cast immediately before starting rowing, and the click brake of the implement is of course set in operation to prevent rotation of the drum 1 due to the normal pull of the lure and to simultaneously cause a noise at a bite. In such trolling it may be suitable to use both hands when pulling in the line, the one hand then gripping the holder casing 3 and the other turning the lid 15 by means of the crank handle 19.

When making a cast with the implement the latter is held as shown in Fig. 5. A suitable length of line is made free to permit swinging away the lure by a rapid motion of the arm while the forefinger controls the departure of line from the drum, and then the implement is tilted over to the position shown in Fig. 6, the middle finger being retained in the finger sleeve 25 during this change of position. Simultaneously the thumb enters the thumb socket 18 ready for turning the lid 15 by a smooth swinging motion of the thumb which is similar to the action of the thumb in crumbling a material between the thumb and forefinger and is very little tiring. Practice has proved that very little training is necessary for handling the implement and for exerting a sufficient pull in the line by such motion of the thumb to land ordinary fish caught, and if necessary the fish may be tired out before landing as is common practice in catching a large one. Landing the fish is particularly facilitated since one hand may be free to assist with net or gaff.

It will be obvious that the construction of the implement may considerably simplified in comparison with the illustrated form if it should be desirable to make the implement less expensive. Thus the spool 32 with the reserve portion of the line 2 may be dispensed with and the winding drum 1 directly secured to the shaft 4. If the cavity of the drum 1 is maintained in such case, it may be used for storing the lure when the implement is not in use. The means for alternating the direction of rotation of the drum 1 including the sleeve 7 and the shifting lever 11 may also be replaced by a fixed bevelled pinion or gear on the shaft 4 meshing with the teeth of the lid 15. The crank handle 19 and even the rail 36 may be dispensed with, and so on.

The man skilled in the art will also readily appreciate that the implement in the illustrated or a simplified form may be combined with a spinning rod of suitable type thus allowing a more advanced casting technique.

I claim:

1. In a line fishing implement the combination of a substantially flat holder casing open at the front thereof and having a side wall of rounded configuration, a circular lid covering the front opening of said casing and being rotatably mounted therein, a rotatable shaft extending through said casing in a direction substantially perpendicular to the axis of said lid and projecting at one end through said side wall, a transverse finger sleeve mounted on the back of said casing and being rotatable about an axis parallel to the axis of said lid, a thumb socket eccentrically mounted in said lid to permit rotation of said lid by the thumb of a hand gripping said holder casing, a bevel gear wheel mounted on the inside of said lid, bevel gear means on said shaft meshing with said bevel gear wheel to transmit the rotation of said lid to said shaft, a winding drum for the fishing line mounted on the end of said shaft projecting through the side wall of said casing, and a line distributing annular rail surrounding said drum and inclined with respect to the axis of said shaft.

2. In a line fishing implement the combination according to claim 1, wherein a click brake is provided between said lid and said casing.

3. In a line fishing implement the combination according to claim 1, wherein said holder casing has an external pin projection on its side wall opposite to said winding drum for facilitating holding the implement in an upright position by one hand during thumb actuated rotation of the lid.

4. In a line fishing implement the combination according to claim 1, wherein said winding drum is hollow and rotatably mounted on said shaft and has a radial opening communicating with the hollow interior of the drum, and further comprising a spool secured to the outer end of said shaft and housed in the hollow interior of said drum to receive a reserve portion of the fishing line extending through said radial opening in said drum, and clutch means including the reserve portion of the fishing line operative to cause said drum to rotate with said shaft only when said spool has received said reserve portion of the fishing line.

5. In a line fishing implement the combination according to claim 4, wherein said hollow interior of said drum is eccentric with respect to said spool and said clutch means includes the interior surface of said drum against which the reserve portion of the fishing line wedges when said reserve portion is wound on said spool.

6. A line fishing implement of the described character comprising a casing open at the front, a circular lid covering the open front of said casing and rotatably mounted on the latter, a shaft journalled in said casing and projecting at one end from the latter, said shaft extending at right angles to the axis of rotation of said lid, a finger receiving member mounted on the back of said casing for securing the latter to one of the user's hands while leaving the thumb of that one hand free, a rotatable drum mounted on the projecting end of said shaft to receive and pay-out a fishing line, thumb engageable means on said lid actuable by the free thumb of the hand secured to said casing to effect rotation of said lid, and transmission means betwene said lid and shaft to effect rotation of said drum in response to actuation of said lid.

7. A line fishing implement according to claim 6; further comprising a pin projecting from said casing in a direction extending radially from the axis of rotation of said lid to be received between two adjacent fingers of the hand secured to the casing.

8. A line fishing implement according to claim 7; wherein said pin is diametrically opposed to the projecting end of said shaft, and said finger receiving member includes an open-ended tubular body rotatably mounted on the back of said casing to swing with respect to the latter about an axis parallel to the axis of rotation of said lid.

References Cited in the file of this patent

UNITED STATES PATENTS

| | | |
|---|---|---|
| 2,439,298 | Horan | Apr. 6, 1948 |
| 2,455,495 | Jellum | Dec. 7, 1948 |
| 2,507,457 | Rix | May 9, 1950 |
| 2,602,602 | Vijande | July 8, 1952 |
| 2,613,468 | Hand | Oct. 14, 1952 |
| 2,617,611 | Meierjohan | Nov. 11, 1952 |
| 2,634,920 | Dunn | Apr. 14, 1953 |
| 2,706,096 | Rufle | Apr. 12, 1955 |

FOREIGN PATENTS

| | | |
|---|---|---|
| 385,769 | Great Britain | Jan. 5, 1933 |
| 813,087 | France | Feb. 15, 1937 |
| 851,851 | France | Oct. 9, 1939 |